Aug. 6, 1940.        J. W. WARDELL        2,210,108
CHICKEN FEEDER
Filed Oct. 22, 1937
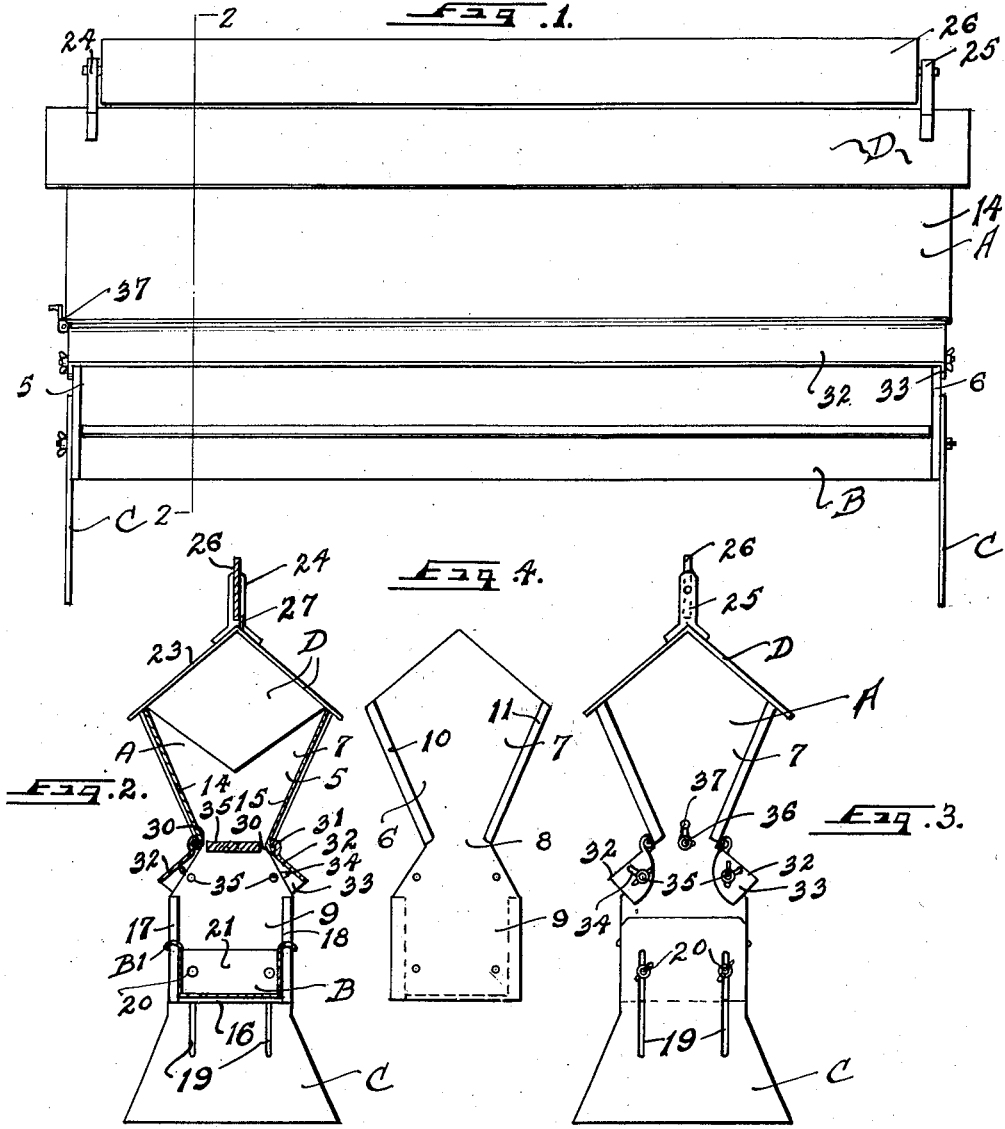
John W. Wardell, Inventor
By R. M. Thomas, Attorney Patented Aug. 6, 1940

2,210,108

UNITED STATES PATENT OFFICE 2,210,108

CHICKEN FEEDER

John W. Wardell, Salt Lake City, Utah

Application October 22, 1937, Serial No. 170,366

1 Claim. (Cl. 119—52)

My invention relates to chicken feeders and has for its object to provide a new and efficient chicken feeder which may be adjusted for small or large chickens and which may be manually controlled to feed a predetermined amount of feed to the pen full of chickens each time the device is operated.

A further object is to provide a chicken feeder which is so constructed that when not in use or when being shipped it may be dismantled and shipped in a very compact form or stored away in little space.

A still further object is to provide a feeder which may be used for baby chicks, full grown chickens, or any other type of poultry such as geese, and turkeys.

A still further object is to provide a feeder for chickens which will save feed, time, and labor and which will be highly efficient in operation.

A still further object is to provide a sanitary chicken feeder which will not permit the chickens to roost or come to rest thereon and which through the manner of building the feeder will cause the chickens to feed without excessive exercise or fighting among themselves while feeding.

These and other objects I accomplish with the device illustrated in the accompanying drawing in which similar numerals and letters of reference indicate like parts throughout the several views and as described in the specification forming a part of this application and pointed out in the appended claim.

In the drawing:

Figure 1 is a side elevation of the feeder.

Figure 2 is a section on line 2—2 of Figure 1.

Figure 3 is an end view of the feeder.

Figure 4 is a view of one of the ends of the device with the sides, cover and support stand removed.

In the drawing I have shown the feeder as made with ends 5 and 6, each end being provided with the top portion 7 somewhat in the shape of a diamond but, with the lower portion of the diamond merged at 8 into an outwardly flared base 9.

Along each side of the lower portion of the diamond-shaped portion 7 I provide channels 10 and 11 in which the side pieces 14 and 15 of the feed storage compartment A are inserted.

Across the bottom of the base of each end there is formed a flange 16 on which the feed trough B is supported and the feed trough B is inserted in channels 17 and 18 on the sides of the base 9 by flanges which are turned out on the ends of the feed trough.

The entire structure is supported at each end by standards C which standards are provided with vertical slots 19 therein in which bolts 20 are passed with the inner end of the bolts secured in the closed ends 21 of the trough B and the outer free end of the bolts carry wing nuts or other suitable nuts for adjusting the distance or height of the feed trough from the floor of the pen.

The open top of the feed storage compartment A is covered by a cover D which is made of an angled plate 23 which plate is bent medially thereof with each edge extending out sufficiently far over the edge of the compartment A when in place thereon to form an eave therealong. Near each end of the cover on the top side I provide brackets 24 and 25 and in these brackets the trip plate 26 is pivotally mounted, said plate being to prevent the chickens from lighting on the top of the feeder and roosting. This trip plate will flip when the chickens light thereon throwing it off balance and the chicken will either fly off or fall off from the plate.

A stop 27 is provided to prevent the trip plate from complete rotation, eliminating the danger of the chicken breaking or bruising a leg between the plate and cover. Each end of the cover is provided with a flange which extends down inside the hopper A to hold the cover in place and also help brace the angle plate.

The lower edges of the sides 14 and 15 are curved at 30 and these curves 30 mesh with curves 31 on adjustable feed control members 32. These members 32 being hingedly connected with the sides are then adjustably mounted and held in position, depending upon the size of the chickens being fed, by bolts 35 passed through the ends 7 and 8 and out through slots 34 in the turned down ends 33 of the plates 32 thus providing for adjustment of the size of the opening between the top of the feed trough B and the feed control members and the distance may be regulated depending upon the size of the chickens or other poultry being fed in the trough.

Centrally in the narrow space between the two lower converging edges of the sides 14 and 15 I mount a feed regulator or dispenser. This consists of a flat plate 35 pivotally mounted on the end pins 36, and controlled by a crank handle 37, the number of turns of the handle regulating the amount of feed allowed to fall into the trough B from the hopper A.

As a saver of feed, the outer edges of each vertical side of the trough B are curved outwardly and slightly downwardly in an arc providing means for directing most of the feed which is scratched out back into the trough. This prevents waste of food for when it falls on the floor it is very seldom if ever eaten.

Having thus described my invention I desire to secure by Letters Patent and claim:

In a chicken feeder of the class described the combination of a hopper formed of two sides set removably in ends with the top of the hopper wider and tapering inwardly at the bottom with the central portion of the bottom open; ends for said hopper having the upper portion raised above the sidewalls in a triangular form and the lower portion extending down to support the feed trough thereon with channels in which flanges at the ends of the sidewalls of the hopper fit; a cover for said hopper fitting over the raised ends with the sides sloping down and extended beyond the width of the body of the hopper; curved flanges along the lower edge of each side of the hopper the curves being outwardly and upwardly; feed control plates each having its top edge bent in a curve meshing with the curve along the edge of the corresponding side of the hopper acting as hinge supports for the control plates and with each end of the feed control plates bent down outside the adjacent end of the hopper and slotted; adjustment screws through said slots and secured in the hopper ends; a longitudinal trough, U-shaped in cross section, fitting into inwardly bent flanges on the lower portions of the ends of the hopper spaced below the opening between the sides of the hopper; and means to adjustably mount each end of the hopper from the supporting area to adjust the height of the feed trough above the level of the supporting area for feeding different sizes of fowls.

JOHN W. WARDELL.